Nov. 20, 1962     K. A. DÜPPENGIESSER     3,064,500

SPADE

Filed Aug. 30, 1960

*INVENTOR:*
Karl August
BY    Düppengiesser

*Karl F. Ross*

AGENT.

United States Patent Office 3,064,500
Patented Nov. 20, 1962

3,064,500
SPADE
Karl August Düppengiesser, Unter der Charlottenburg 1,
Gera-Langenberg, Thuringia, Germany
Filed Aug. 30, 1960, Ser. No. 52,999
4 Claims. (Cl. 76—113)

My present invention relates to shovels, spades and similar soil-working implements and has as its primary object the provision of an improved spade, shovel or the like having a blade portion formed integral with a socket portion and fashioned from a single piece of sheet stock, the socket portion being adapted to receive a handle.

A more particular object of my invention is to provide a relatively simple spade or shovel inexpensive to manufacture wherein the blade member is formed integral with the socket member in a manner capable of developing considerable strength even when the implement is of sufficiently light-weight construction to enable women and children to manipulate it effectively.

Still another object of the present invention is to provide an effective cold-forming process for making an implement of the character set forth above.

Yet a further object of the invention is to provide a soil-working implement of this type wherein the working surface of the blade, and especially its underside, is substantially free from recesses or projections which might collect dirt or impede the operation of the tool. It is also an object to provide means on the top side of such implement for laterally cutting into the soil during the final part of a working stroke so as to facilitate the severing of the clods to be lifted by the blade.

According to a feature of my invention, a generally Y-shaped blank is stamped or otherwise cut from a strip of sheet metal (preferably steel). The shank of the Y corresponds in width to the blade of the implement to be fashioned therefrom. The arms of the Y form two tongues, integral with and in the plane of the shank, which are then bent upwardly at right angles to the shank and formed, at least upon their extremities remote from the shank, with curvatures corresponding to that of the handle member. The latter is then received between the two facing concave extremities of the tongues and rigidly secured thereto. The width of the strip is, advantageously, equal to the sum of the widths of the shank and the tongues.

In an advantageous embodiment of the invention, the handle member when secured in the socket so formed is maintained spaced from the heel of the blade, so that the user of the implement may insert his foot between the socket-forming tongues, adjacent the longitudinal edges of the blade, and against the heel thereof to drive the blade into the ground. The heel of the blade, when used as a treadle, may be suitably reinforced. Since the tongues are bent upwardly, the bottom surface of the blade is free from projections, recesses or like impediments.

Alternatively, the portions of the tongues intermediate their extremities may be bent to abut the heel of the blade, thereby providing simultaneously reinforcement for the heel of the blade and a treadle for forcing the latter into the ground.

The above and other objects, features and advantages of my invention will become more readily apparent from the following specific description, reference being made to the accompanying drawing in which.

Figure 1:
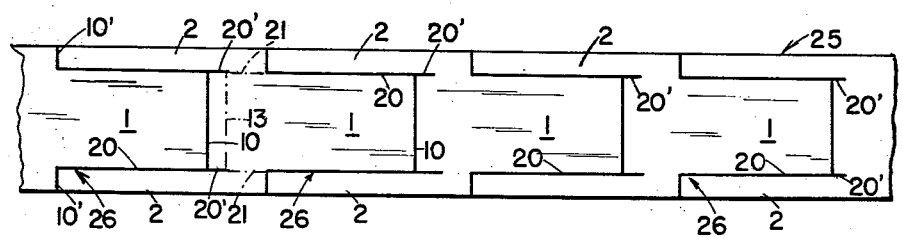
FIG. 1 is a plan view of a strip of sheet steel from which the blanks for forming an implement according to the invention may be stamped.

In FIG. 1 I show a strip of sheet steel 25 from which the implement blanks 26, nested in one another, are stamped. To eliminate wastage, the width of strip 25 is selected to equal the sum of the widths of blade portion 1 and the tongues 2 of each blank 26. Furthermore, the latter are so positioned on the strip 25 that the blade 1 of one blank 26 is formed from the material between the tongues 2 of an adjacent blank; thus, the length of each rectangular strip constituting one of the tongues 2 equals the corresponding dimension of the rectangular sheet-metal plate which represents the blade portion 1. The blanks 26 are defined by the stamping incisions 10 and 10′, transverse to the major dimension of the sheet 25, and the longitudinal incisions 20 which, with the longitudinal edges of the strip 25, define the tongues 2 offset from the blade 1 along the parallel lateral edges thereof. Incisions 20 have extensions 20′ whose end points are the termini of a transverse fold line 13 (dot-dash line in FIGS. 1 and 2) and the longitudinal fold lines 21 (dot-dash lines) of each blank, the latter being extensions of the aforesaid lateral edges of blade portion 1.

Figure 2:
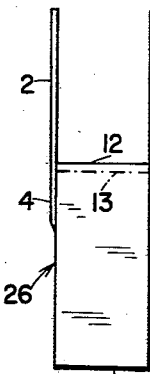
FIG. 2 is a plan view illustrating a second stage in the formation of the implement.
Figure 3:
FIG. 3 is a side-elevational view of the blank shown in FIG. 2.

As may be seen from FIGS. 2 and 3, the tongues 2 of a blank 26 are next folded at right angles to the plane of blade 1 along the fold line 21 while remaining integrally connected with the blade over portions 4 of their length; the portions 4 also form lateral soil-cutting edges on opposite sides of the rear part of the blade. Incisions 10 (FIG. 1) simultaneously produce the leading or front edge 11, which may be suitably sharpened, and the trailing edge 12 of each blade 1.

Figure 4:
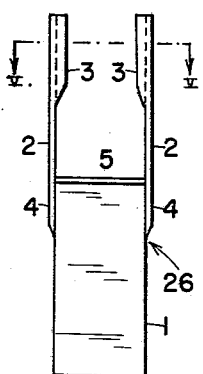
FIG. 4 is a view similar to FIG. 2 illustrating still a further stage in the manufacture of the implement.
Figure 5:
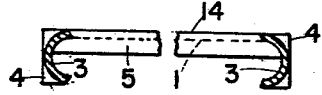
FIG. 5 is a cross-sectional view taken along line V—V of FIG. 4.

FIGS. 4 and 5 illustrate further steps in the reshaping of the blank 26. The extremities 3 of each tongue 2 remote from the blade 1 are provided with facing concavities whose curvature corresponds substantially to that of the handle adapted to be used in conjunction with the blade 1. The trailing edge 12 of the latter is bent at a right angle to the plane of the blade 1, about the line 13 of FIG. 1, thereby forming a reinforcing flange 5 along the heel of the blade.

Figure 6:
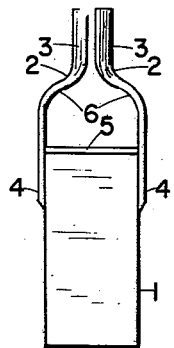
FIG. 6 is a plan view of the implement blade now integrally provided with a socket.
Figure 8:
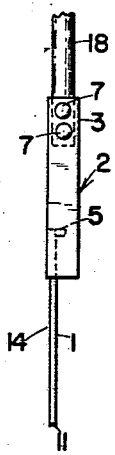
FIG. 8 is a side-elevational view of the implement of FIG. 7.
Figure 7:
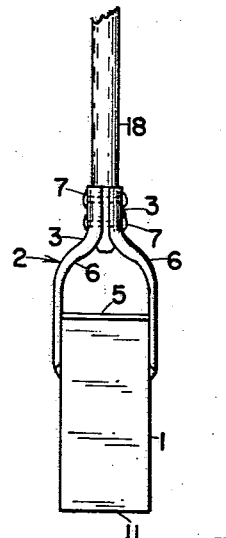
FIG. 7 is a plan view of the completed implement.

The intermediate portions 6 of the tongues 2, between their socket extremities 3 and their fixed extremities 4, are bent toward one another, as shown in FIG. 6, until their socket extremities 3 are able to receive snugly a handle member 18 which is inserted therebetween. The handle 18 is secured to the generally semicylindrical socket extremities 3 by means of rivets 7 or the like. The space between the bent portions 6 of tongues 2 and the flange 5 is sufficient to admit the foot of the user of the implement as he steps on the flange 5 to drive the blade into the ground. The completed implement is shown in FIGS. 7 and 8. The entire shaping of a blank 26 may be carried out with conventional cold-forming methods since only a minimal amount of bending need be effected.

Figure 9:
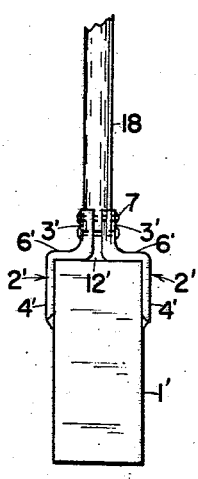
FIG. 9 is a view similar to FIG. 7 of an implement according to another embodiment of the invention.

FIG. 9 illustrates an embodiment of the invention wherein two tongues 2′ are provided with portions 4′ integral with the blade 1′ and have intermediate portions 6′ closely abutting the heel of the blade whose trailing edge has not been bent over. The socket portion 3′ of each tongue 2' partially surrounds the handle 18 while being affixed thereto by means of rivets 7. The intermediate portions 6' thus serve as reinforcements for the heel of the blade 1' and as a treadle. There is no need in this case for extending the incisions 20 in FIG. 1 beyond the transverse line 10 as shown at 20'.

The improvement described and illustrated is deemed to admit of many modifications and variations considered to be within the ability of persons skilled in the art and intended to be included within the spirit and scope of my invention as defined in the appended claims.

I claim:
1. In the manufacture of a soil-working implement the steps of forming a sheet-metal blank with an inner blade portion having parallel lateral edges and a pair of spaced-apart tongues integral with and in the plane of said blade portion but laterally offset therefrom along said lateral edges, bending said tongues out of said plane about the lines of said lateral edges into a position in which they are substantially parallel to each other and perpendicular to said blade portion, curving projecting extremities of the tongues so bent into generally semicylindrical shape with their concave sides facing each other, and forming a handle socket by bringing said concave sides close together.

2. A process for manufacturing a soil-working implement, comprising the steps of forming a sheet-metal blank with an inner blade portion having parallel lateral edges and a pair of spaced-apart tongues integral with and in the plane of said blade portion but laterally offset therefrom along said lateral edges, bending said tongues out of said plane about the lines of said lateral edges into a position in which they are substantially parallel to each other and perpendicular to said blade portion, curving projecting extremities of the tongues so bent into generally semicylindrical shape with their concave sides facing each other, forming a socket by bringing said concave sides close together inserting a handle in the socket thus formed, and securing said handle to said socket.

3. A process for manufacturing a soil-working implement, comprising the steps of forming a sheet-metal blank with an inner blade portion having parallel lateral edges and a pair of spaced-apart tongues integral with and in the plane of said blade portion but laterally offset therefrom along said lateral edges, bending said tongues out of said plane about the lines of said lateral edges into a position in which they are substantially parallel to each other and perpendicular to said blade portion, bending an edge of said blade portion transversely into a flange bridging said tongues whereby a footrest is formed, curving projecting extremities of the tongues so bent into generally semicylindrical shape with clearance from said flange and with their concave sides facing each other, forming a socket by bringing said concave sides close together, inserting a handle in the socket thus formed, and securing said handle to said socket.

4. A process for manufacturing a soil-working implement, comprising the steps of forming a sheet-metal blank with an inner blade portion having parallel lateral edges and a pair of spaced-apart tongues integral with and in the plane of said blade portion but laterally offset therefrom along said lateral edges, bending said tongues out of said plane about the lines of said lateral edges into a position in which they are substantially parallel to each other and perpendicular to said blade portion, curving projecting extremities of the tongues so bent into generally semicylindrical shape with their concave sides facing each other, and with intermediate tongue portions adjoining a transverse edge of said blade portion as a reinforcement therefor, forming a socket by bringing said concave sides close together, inserting a handle in the socket thus formed, and securing said handle to said socket.

References Cited in the file of this patent
UNITED STATES PATENTS

| | | |
|---|---|---|
| 451,469 | Evans | May 5, 1891 |
| 524,719 | Kretsinger | Aug. 21, 1894 |
| 757,783 | Skelton | Apr. 19, 1904 |
| 926,146 | Skinner | June 29, 1909 |
| 1,411,166 | Currier | Mar. 28, 1922 |
| 2,063,774 | Washington | Dec. 8, 1936 |
| 2,147,980 | Koenig | Feb. 21, 1939 |